(12) United States Patent
Osaki (10) Patent No.: US 7,912,223 B2
(45) Date of Patent: Mar. 22, 2011

(54) METHOD AND APPARATUS FOR DATA PROTECTION

(75) Inventor: Nobuyuki Osaki, Saratoga, CA (US)

(73) Assignee: Hitachi, Ltd., Tokyo (JP)

( * ) Notice: Subject to any disclaimer, the term of this patent is extended or adjusted under 35 U.S.C. 154(b) by 972 days.

(21) Appl. No.: 11/537,550

(22) Filed: Sep. 29, 2006

(65) Prior Publication Data
US 2008/0082836 A1     Apr. 3, 2008

(51) Int. Cl.
H04L 9/00 (2006.01)
G06F 12/14 (2006.01)
G06F 17/30 (2006.01)

(52) U.S. Cl. .................. 380/277; 713/193; 726/33
(58) Field of Classification Search .............. 380/277; 713/193; 726/33
See application file for complete search history.

(56) References Cited

U.S. PATENT DOCUMENTS

| | | | | |
|---|---|---|---|---|
| 4,694,412 A * | 9/1987 | Domenik et al. | ............. | 708/251 |
| 6,115,802 A * | 9/2000 | Tock et al. | ............. | 711/216 |
| 6,625,734 B1 * | 9/2003 | Marvit et al. | ............. | 726/28 |
| 7,461,263 B2 * | 12/2008 | Prince | ............. | 713/182 |
| 7,472,186 B2 * | 12/2008 | Dague et al. | ............. | 709/224 |
| 2002/0199099 A1 * | 12/2002 | Shirai et al. | ............. | 713/160 |
| 2005/0013462 A1 * | 1/2005 | Rhoads | ............. | 382/100 |
| 2005/0102527 A1 * | 5/2005 | Tatebayashi et al. | ......... | 713/189 |
| 2006/0026444 A1 * | 2/2006 | Asano et al. | .................. | 713/193 |
| 2006/0190732 A1 * | 8/2006 | Fery et al. | .................... | 713/176 |
| 2007/0220277 A1 | 9/2007 | Osaki | | |

OTHER PUBLICATIONS

Gutmann, Peter, "Secure Deletion of Data from Magnetic and Solid-State Memory," *Sixth USENIX Security Symposium Proceedings*, Jul. 22-25, 1996, San Jose, U.S.A.
"Department of Defense Directive 5220.6," Jan. 2, 1992.
"Department of Defense Directive 5220.22," Sep. 27, 2004.
"Decru Dataport™ Storage Security Appliances," 2005, Decru, Inc., Redwood City, U.S.A.

* cited by examiner

Primary Examiner — Kambiz Zand
Assistant Examiner — Michael Guirguis
(74) Attorney, Agent, or Firm — Sughrue Mion, PLLC (57) ABSTRACT

Described is a method for secure data disposal. Data stored in storage volume(s) is encrypted with a specific encryption key. Before the key is disposed of, a clear text string is encrypted with the same key and the encrypted data is associated with the clear text string and stored in a repository. When a new key is created to encrypt a new volume, each of the encrypted data in the repository is checked to determine whether the encryption of the associated clear text string using the new key generates the same encrypted string as the stored encrypted data. If the result of the encryption of the clear text string matches at least one stored encrypted string, the associated new key is not used and another key is generated until the new key results in an encrypted string which does not match any stored encrypted strings.

23 Claims, 8 Drawing Sheets

|     | 407 | 408      | 409                                             |
|-----|-----|----------|-------------------------------------------------|
| 401 | LUN | Key Value | Address Range                                  |
| 402 | 0   | key0     | 0:0-1023, 0:2048-3071, 1:0-1023, 1:2048-3071    |
| 403 | 1   | key1     | ...                                             |
| 404 | 2   | key2     | ...                                             |
| 405 | 3   | key3     | ...                                             |
| 406 | 4   | key4     | ...                                             |
|     | 5   | key5     | ...                                             |

Figure 4

|     | 505        | 506         | 507                                             |
|-----|------------|-------------|-------------------------------------------------|
| 501 | Clear Text | Cipher Text | Address Range                                   |
| 502 | text0      | cipher0     | 0:0-1023, 0:2048-3071, 1:0-1023, 1:2048-3071    |
| 503 | text1      | cipher1     | ...                                             |
| 504 | text2      | cipher2     | ...                                             |
|     | text3      | cipher3     | ...                                             |

Figure 5

| LUN | Host WWN |
|---|---|
| 0 | 113 |
| 1 | 114 |
| 2 | 113,114 |
| 3 | 114 |
| 4 | … |
| 5 | … |

METHOD AND APPARATUS FOR DATA PROTECTION

DESCRIPTION OF THE INVENTION

1. Field of the Invention

The present invention generally related to computer security and more specifically to systems and methods for secure data disposal.

2. Description of the Related Art

In certain storage applications, data stored on magnetic disk drives must be retained for a certain time period and then, after the specified expiration date, securely disposed of. Once the expiration date has passed, the physical disks or other devices which contained the data may be re-used by other users or applications for other purposes or may be entirely disposed of. Because even after the erasure by conventional techniques, the magnetic storage media may leave traces of information, which used to be written thereon, there is a need for secure data erasure technique in order to avoid security breaches associated with sensitive information being accessed by unauthorized persons.

There exist conventional techniques for securely erasing data from magnetic media such as magnetic disks by means of overwriting such data multiple times with new or random data. For example, DoD (Department of Defense) Directive 5220, incorporated herein by reference calls for multiple data block overwrites to erase magnetic data. Another method for securely erasing data from magnetic media is described in "Secure Deletion of Data from Magnetic and Solid-State Memory" by Peter Gutmann, Department of Computer Science, University of Auckland, New Zealand (http://www.c-s.auckland.ac.nz./~pcut001/pubs/secure del.html), incorporated herein by reference. Unfortunately, all the conventional methods for sanitizing magnetic media are very time consuming and are not suitable for use when the disks need to be disposed of or reused immediately after the data expiration date or end of the usage of the data.

Another way to ensure secure disposal of data is to have the data securely encrypted with a key. It is known in the art that disposal of a key which encrypts such data has a similar effect to data disposal. For example, CRYPTOSHRED™ key deletion technology, available in products provided by Decru, Inc., involves secure deletion of encryption keys, resulting in all copies of associated encrypted data being instantly destroyed. As would be appreciated by those of skill in the art, this method, which involves disposing of encryption keys on a condition that the data has been encrypted and stored on magnetic disks, has a similar effect to secure data deletion described above. The primary advantage of the data deletion by cryptographic key disposal is in the speed of the data disposal process. Specifically, the key erasure takes a very short time compared with conventional techniques, wherein all data must be over-written multiple times.

However, if after a secure disposal of an encryption key, a new key is created, which happens to be identical to the destroyed old key, one could use the newly generated key to access the supposedly destroyed data. In such a situation, the security of the data disposal system would be compromised.

SUMMARY OF THE INVENTION

The inventive methodology is directed to methods and systems that substantially obviate one or more of the above and other problems associated with conventional techniques for secure data disposal.

In accordance with one aspect of the inventive methodology, there is provided a computerized storage system including a storage controller comprising a central processing unit (CPU) and a memory unit. The storage controller is configured to allocate a storage volume; generate an encryption key for the allocated storage volume; and determine whether the encryption key is unique. If the encryption key is not unique, the storage controller is configured to generate a second encryption key for the allocated storage volume. The storage controller is further configured to store the generated encryption key or the second encryption key in the memory unit. The computerized storage system further includes at least one storage device operatively coupled with the storage controller and operable to store data encrypted with the stored encryption key.

In accordance with another aspect of the inventive methodology, there is provided a computer-implemented method and an associated computer programming product embodied in a computer readable medium, which, when executed by one or more processors, causes the one or more processors to execute the aforesaid method. The inventive method involves allocating a storage volume; generating an encryption key for the allocated storage volume and determining whether the encryption key is unique. If the encryption key is not unique, a second encryption key is generated for the allocated storage volume. The inventive method further involves storing the generated encryption key or the second encryption key and encrypting data associated with the allocated storage volume using the stored encryption key.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

An exemplary secure data disposal system and method is described in detail in U.S. patent application Ser. No. 11/385,581 entitled "METHOD AND APPARATUS FOR DATA DISPOSAL," which is incorporated herein by reference in its entirety.

Figure 1:
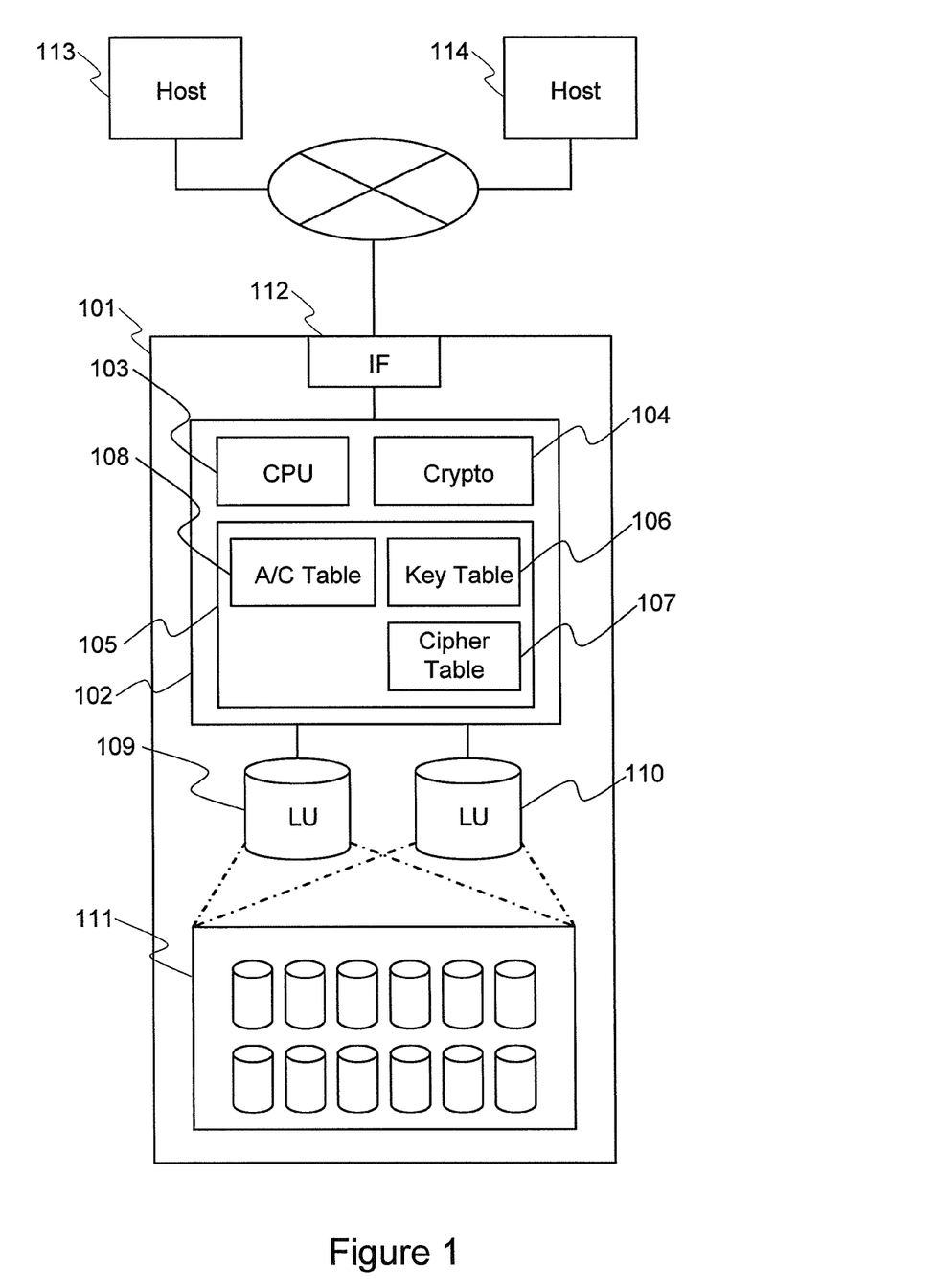
FIG. 1 illustrates an exemplary configuration of a computerized system in accordance with the present invention.

FIG. 1 illustrates an exemplary configuration of a computerized system in accordance with the present invention. The system shown in FIG. 1 includes storage system 101 incorporating storage controller 102, CPU 103, cryptographic module 104, memory 105, key table 106 and cipher table 107. Each row of the key table 106 contains at least an encryption key and a range of storage addresses to which the encryption key is applied. Each row of the cipher table 107 contains at least a clear text, a cipher text, which is the result of encryption of the clear text with an encryption key, and an address range of the data storage device to which the key is applied. The storage controller 108 further incorporates access control table 108, which defines which host has the access to specific storage resources such as logical units (LUs).

The storage system 101 incorporates logical units 109 and 110, which are connected to the storage controller 102. These logical units are composed of one or more physical disks 111. The storage system 101 additionally incorporates interface 112, which enables communication of the storage system 101 with hosts 113, 114 via a variety of communication protocols, such as Fibre Channel protocol well known to persons of ordinary skill in the art.

Figure 6:
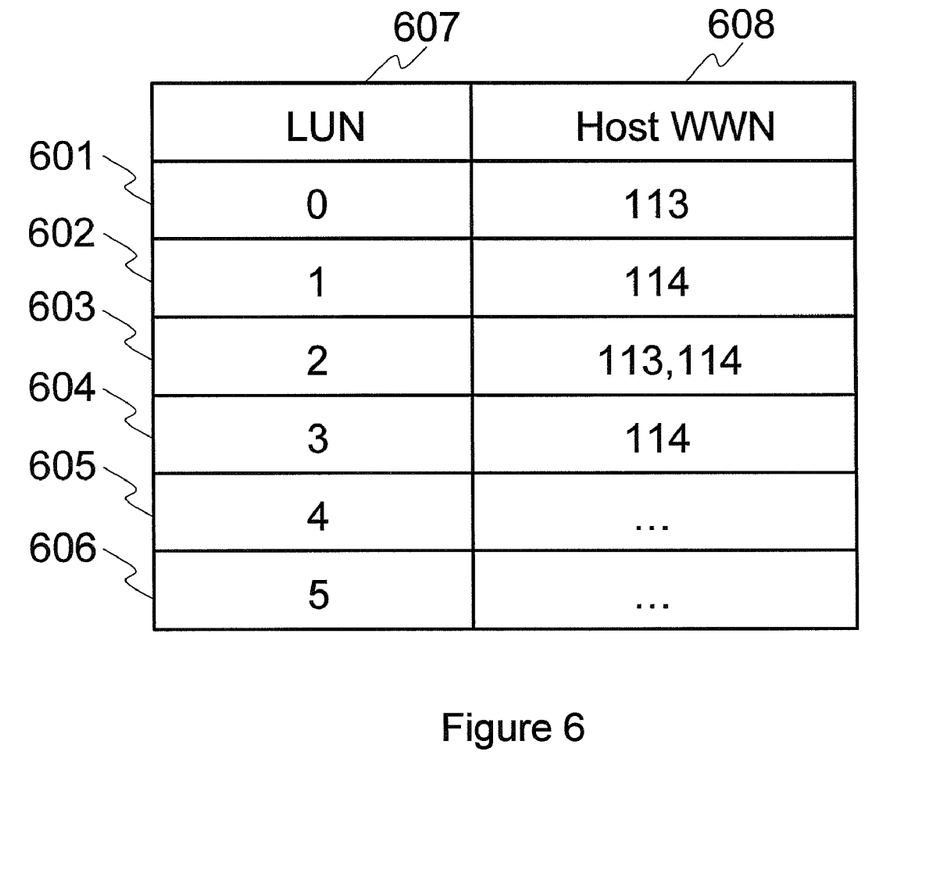
FIG. 6 illustrates an example of the access control table.

In the system shown in FIG. 1, the host 113 has an access to the LU 109 and the host 114 has an access to the LU 110. The storage assess permission information is defined in the access control table 108. FIG. 6 provides an example of the access control table 108. The table specifies hosts having access permissions to each LU by WWN (World wide name). In the exemplary table shown in FIG. 6, the row 401 corresponds to LU 109 and the row 402 corresponds to LU 110. Thus, LUN for LU 109 is 0 and LUN for LU 110 is 1.

Figure 4:
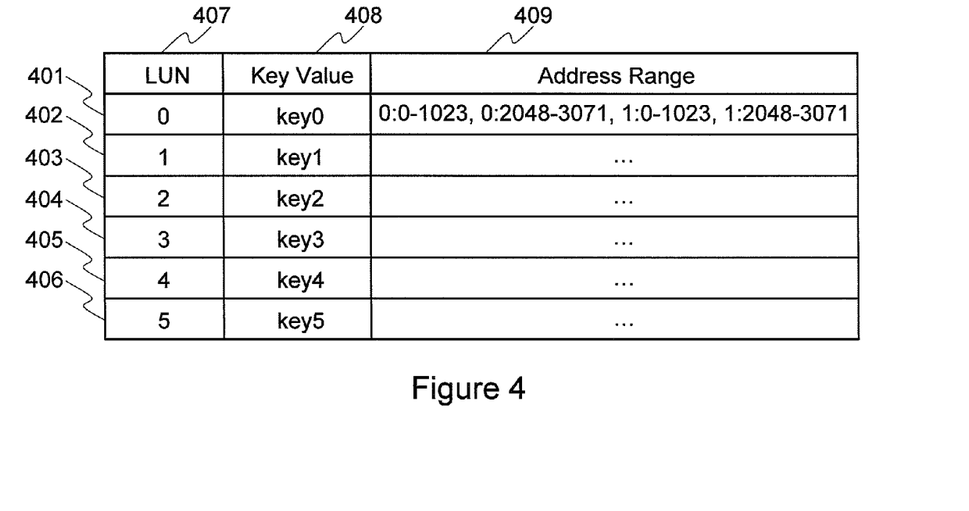
FIG. 4 illustrates one exemplary implementation of the key table.

Data stored on some of the LUs in the storage system 101 may or may not be encrypted. When the data on the LU is encrypted, this fact is indicated by one or more records in the key table 106, which also stores the corresponding encryption key. FIG. 4 provides one exemplary implementation of the key table 106.

The exemplary embodiment of the key table shown in FIG. 4 includes a key value column 408 and an LUN column 407, which identifies the LUs to which the key is applied. The key table further includes address range column 409, containing information on addresses of physical disks composing the specific LU.

It should be noted that the information contained in the columns 407 and 409 may be associated in a separate table. The row 401 of the column 409 specifies the LU with LUN 0 consisting of a storage area extending from the logical block address 0 to 1023 of hard disk drive (HDD) 0, a storage area extending from the logical block address 0 to 1023 of HDD 1 and a storage area extending from the logical block address 2048 to 3071 of HDD 1.

In an embodiment of the inventive system, the key values stored in the column 408 of the key table 106 are kept confidential and only the crypto module 104 has the access to those keys. It should be noted that in FIG. 1, the key table 106 is shown outside of the crypto module 104. However, in an alternative embodiment of the invention, the key table may be incorporated into the crypto module 104 in order to facilitate the confidentiality of the key information. In an embodiment of the invention, the crypto module 104 is configured to perform all functions associated with managing the key information, such as generating keys, encrypting/decrypting data with the generated keys and comparing keys, as will be described in detail below. The keys stored in the key column 408 may be protected during storage by means of encryption using a separate key stored in the crypto module 104, or they may be protected by means of tamper resistant memory, such as a smart card, having access control mechanism allowing only the crypto module 104 the access to the stored keys.

When the storage system 101 receives a read command from the host 113, instructing it to read data from the LU 109, the CPU 103 authenticates the received access request and the associated issuing host based on the information stored in the access control table 108. If the authentication is successful, the CPU 103 reads the requested data from the LU 109 and forwards the read data to the crypto module 104. The crypto module 104 decrypts the data with an encryption key associated with the source LU, for example key0, which is retrieved from the key table 106. Upon the completion of the decryption operation, the decrypted data is returned to the CPU 103. The CPU 103 then incorporates the result into a response message and forwards it to the host 113. On the other hand, if the requesting host cannot be authenticated, the storage system 101 does not perform the described decryption operation and does not return the decrypted data to the host.

When the storage system 101 receives a write command from the host 113 instructing it to write data to the LU 109, the CPU 103 authenticates the received write request and the associated issuing host based on the information stored in the access control table 108. If the authentication is successful, the CPU 103 forwards the data associated with the write command to the crypto module 104. The crypto module 104 encrypts the data with an encryption key associated with the target LU, which is retrieved from the key table 106 and returns the encrypted data to the CPU 103. The CPU then writes the encrypted data at the address on the target LU, which is specified in the write command.

Data on the LU 110 is also encrypted and the key key1 is used for the encryption/decryption. When the host 114 terminates the use of the LU 110, the administrator may want to delete the data on the LU 110 is a secure manner and physically dispose of the storage medium. In order to securely delete the data on the LU 110, the key1 is removed from the memory of the storage system.

However, at some future time, when the host 113 requires another encrypted volume, a new LU as well as a new encryption key is allocated to the host 113 upon a request. When, at that future time, the host 113 reads new data stored on the new LU and decrypts that data with a new key.

If the storage system does not perform a check whether the new encryption key is identical to the old encryption key, there is a chance that physical address range for the LU 110 and that of the new LU overlap and if the new key happens to have the same value as the old key, which had been used by host 114, the host 113 can read the decrypted data which had been written by the host 114. Therefore, an embodiment of the inventive system ensures that different keys are to be used for encrypting data, especially when the same physical address ranges are allocated to two different hosts.

As would be appreciated by one of ordinary skill in the art, the possibility for two generated encryption keys to have the identical value is substantially low. However, depending on the algorithm utilized to generate the keys, it may be difficult to ensure that the generated keys are indeed different without performing the testing. Another difficulty stems from the fact that the key are deleted and may not be readily available for testing. Yet another security problem occurs when different hosts 113 and 114 both use identical keys, which gives one host the access to the secure data handled by the other host.

Moreover, in a situation when the host 114 terminates the use of the LU 110 and de-allocates the associated storage resources, the storage system 101 may reuse the released disk resources by, for example, expanding the size of the LU 109, which is associated with a different host 113. In other words, the host 113 may expand the size of the associated volume 109 by allocating physical disk resources, which happen to have been occupied by LU 110, storing data associated with the host 114. If the LU 110 had been using the same key as the LU 109, the host 113 can read the data associated with the host 114. Thus, uniqueness of keys may need to be ensured even if the address ranges do not overlap.

Figure 2:
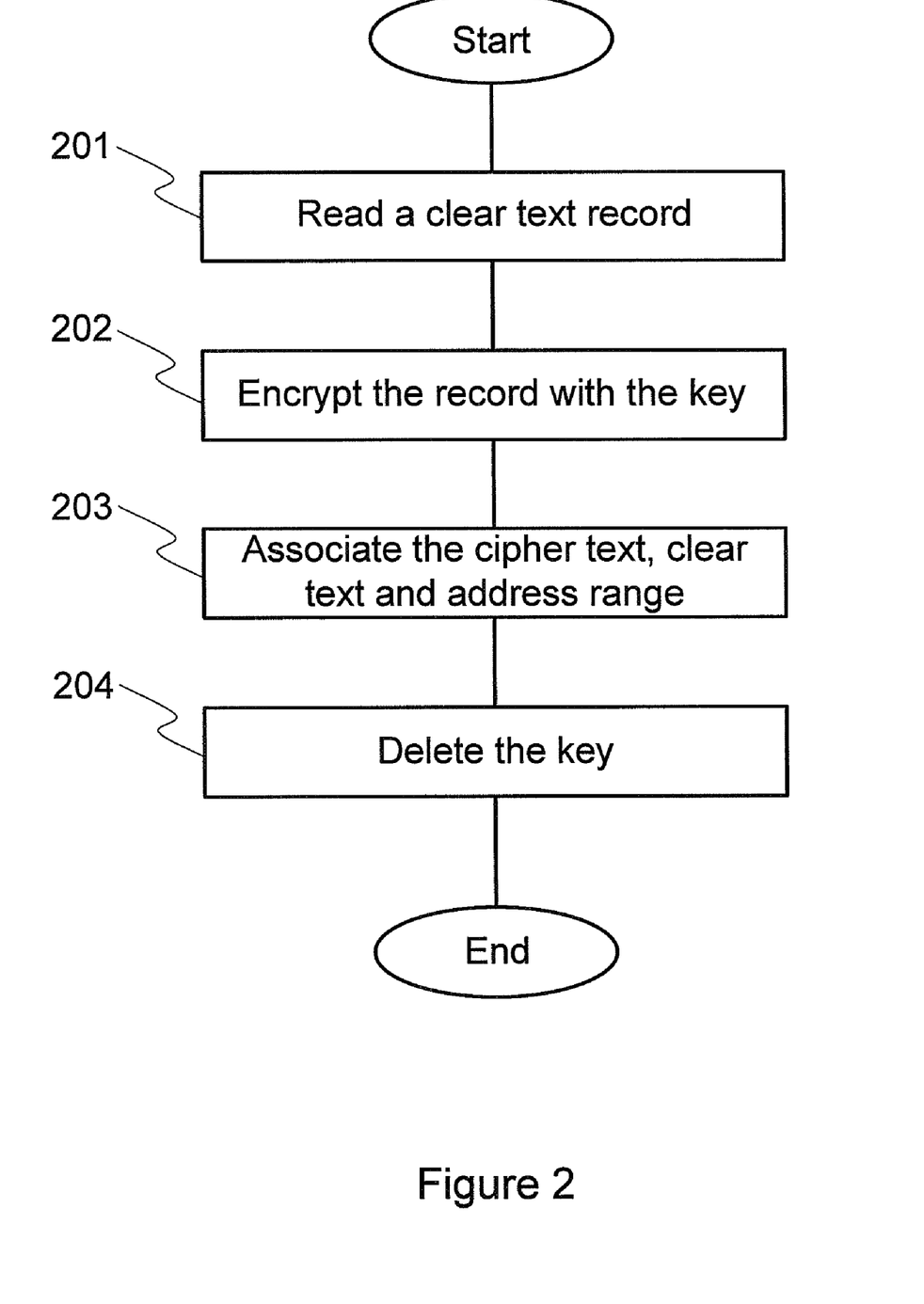
FIG. 2 illustrates an exemplary process for deletion of data stored on an LU in accordance with the present invention.

FIG. 2 illustrates an exemplary process for deletion of data stored on an LU in accordance with the present invention. In short, the entire data on a specific LU is deleted by deleting the corresponding encryption key from the memory 105 so that the stored data can no longer be decrypted with the key. The process shown in FIG. 2 starts when the storage system 101 receives a command instructing it to delete entire data stored on the LU 109.

At step 201, the CPU 103 reads a clear text string. This clear text string may be generated on demand whenever the process of FIG. 2 is initiated, or it may be pre-generated in advance. When the clear text string is generated prior to the execution of the shown process, it may be unique to the LU 109 or may be shared by multiple LUs. In an embodiment of the invention, the value of the clear text string 109 is arbitrary. For example, it may be a random number, or a string consisting of all zeros. The length of the clear text string may be also arbitrary. In one embodiment of the invention, the length of the clear text string is equal to the length of the encryption key, which is being deleted. If the length of the clear text string is variable, an additional column to accommodate the length value is added to the cipher table 107. The length of the clear text string is preferably that of input which the encryption algorithm accepts, e.g. 64 bits for DES and 128 bits for AES. If the clear text string is longer than the above length, a mode of operation to handle the long text string needs to be defined, and if the clear text string is shorter or has an odd number of the length of algorithm input, a padding method to be used needs to be defined.

At step 202, the clear text string is encrypted with the key. This step results in a cipher text.

Figure 5:
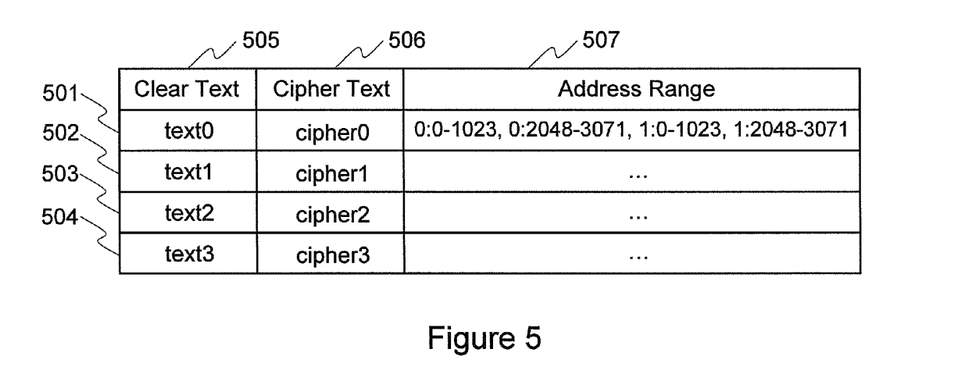
FIG. 5 illustrates an exemplary embodiment of the cipher text table.

At step 203, the cipher text, the clear text string and the associated address range of the LU are stored in the same row of the cipher text table 107. FIG. 5 provides an exemplary embodiment of the cipher text table. The cipher text table comprises clear text column 505, cipher text column 506 and address range column 507. The address range of the LU 109 stored in column 507 may be retrieved from the appropriate column of the key table 106. When the clear text string has a certain predetermined value, or when the same string is shared by multiple LUs, the string value does not have to be stored in the cipher text table 107.

At step 204, the key is deleted from the key table 106. When the key is deleted, the value in the column 408 of the appropriate table row may be zero-filled to indicate that the key is deleted. Alternatively, the table may include an additional column, which may indicate that the LU does not have an associated key.

Figure 3:
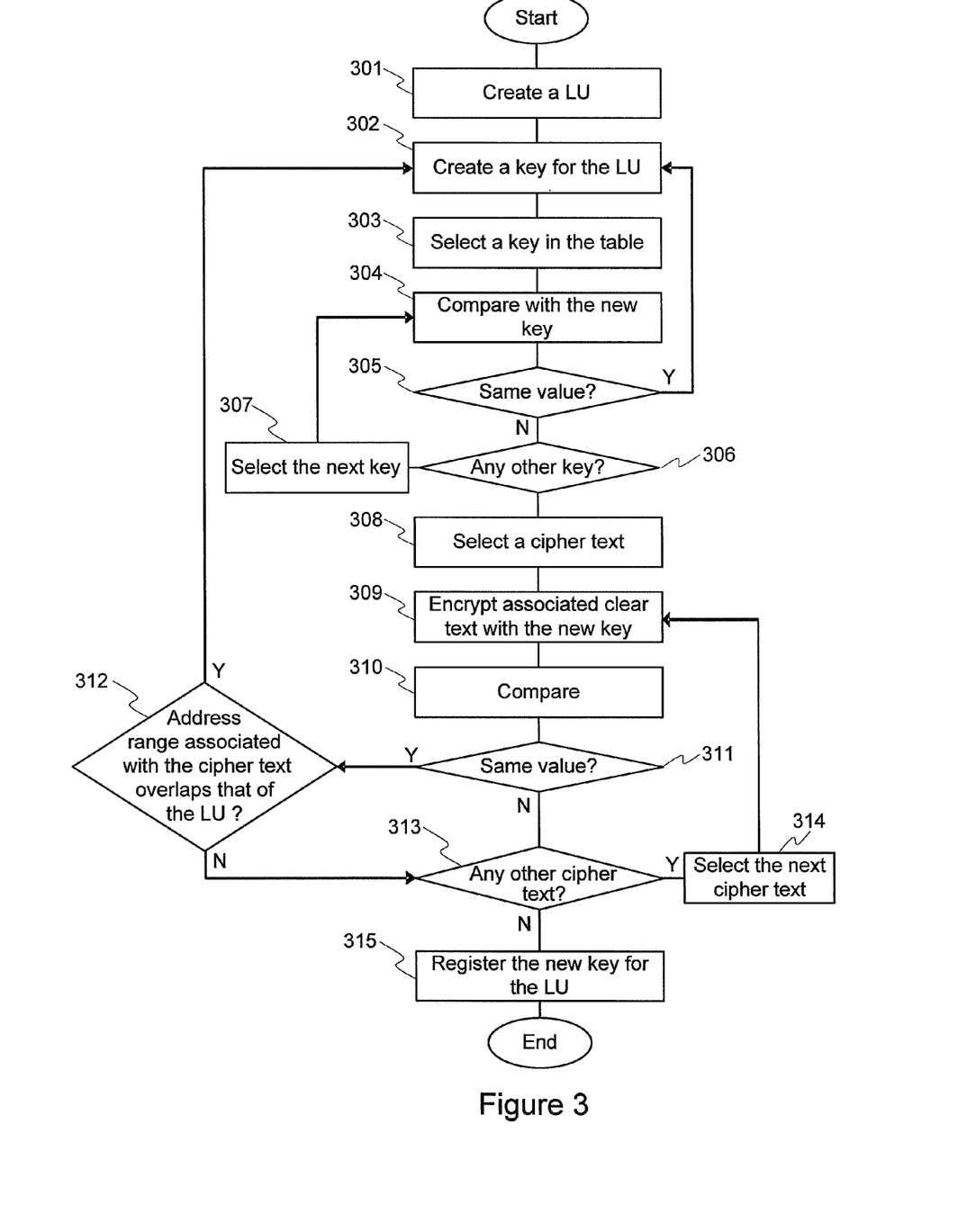
FIG. 3 illustrates an exemplary process for creating a new encrypted LU.

FIG. 3 illustrates an exemplary process for creating a new encrypted LU.

At step 301, the storage controller 102 creates a new LU from a pool of the physical disks 111. The newly created LU is assigned an LUN and a record consisting of the LU information and the associated address range is added to the key table 106. At this time, the key value field 408 is empty.

At step 302, the crypto module 104 creates an encryption key to encrypt the data stored on the LU. The software module configured to generate the encryption keys may be implemented based on one of random number generation algorithms well known to persons of skill in the art. The keys generated by the aforesaid module are not in any way correlated with one another. For example, keys may be derived using a secret string and a public sequence number. In one embodiment of the invention, the keys are derived by encrypting the public sequence number with the secret string. However, in such an embodiment, a key is recoverable even when the key is deleted as long as the secret string is not discarded.

At step 303, the crypto module 104 selects next key in the key table 106 starting with the first stored key.

At step 304, the crypto module 104 compares the selected key with the newly generated key.

If, at step 305, it is determined that the compared keys have the same value, the process proceeds back to the aforesaid step 302, whereupon a different key is generated. If the generated key and the selected key are different, at step 307, the crypto module 104 selects the next key from the key table 106 and proceeds back to the step 304. The aforesaid loop continues until all keys stored in the key table 106 have been selected. The steps from 303 to 307 are performed to ensure the uniqueness of the generated keys. If the uniqueness of the keys is not required, the aforesaid steps 303 to 307 are skipped.

At step 308, the crypto module 104 selects a cipher text string and the associated clear text string from the cipher table 107.

At step 309, the crypto module 104 encrypts the clear text string with the key generated at step 302.

At step 310, the crypto module 104 compares the result of the encryption operation with the cipher text string selected at step 308.

At step 311, if it is determined that the result of the encryption operation and cipher text string have the same values, the process proceeds to step 312.

At step 312, the crypto module 104 checks whether the address range in the column 507 of table 107, shown in FIG. 5, which associated with the cipher text string overlaps with the address range corresponding to the LU created at step 301. If it does, the process returns back to the step 302. If there is no overlap, the process proceeds to the step 313.

At step 313, if there still are cipher text strings in the cipher table 107, which have not been selected, the process proceeds to step 314. Otherwise, the process proceeds to step 315.

At step 314, the crypto module 104 selects the next cipher text string from the cipher table 107 and proceeds to the step 309.

At step 315, the crypto module 104 stores the key generated at step 302 in a record inserted into the key table 106.

Figure 8:
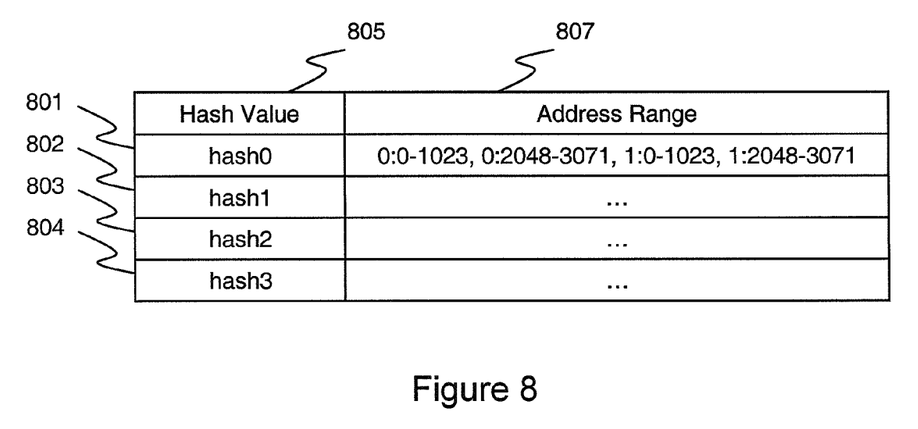
FIG. 8 illustrates an exemplary embodiment of a hash table.

Certain alternative embodiments of the invention will now be described. The described embodiment of the cipher table 107 stores the pair of clear text string and cipher text string, with the latter being the result of encrypting the former with the corresponding key. In another embodiment of the invention, the aforesaid pair is replaced with a hash function, such as SHA-1 and HMAC, which are well known to persons of ordinary skill in the art. The aforesaid hash function is applied to the key that is being deleted. Instead of the aforesaid pair of clear text string in column 505 and cipher text string in column 506, the table 107 includes just one column 805 storing the hashed value of the deleted key, in addition to the column 807 storing the corresponding address range, as shown in FIG. 8. Hash values 801-804 correspond to different encryption keys. As one of ordinary skill in the art would appreciate, the deleted encryption key is not recoverable using the hashed value thereof, and, therefore, the use of the hash function is secure.

In the aforesaid alternative embodiment, the encryption processes at the aforesaid steps 202 and 309 shown in FIGS. 2 and 3, respectively, are replaced with the appropriate hashing processes.

As would be appreciated by one of ordinary skill in the art, unlike the situation with encryption of the keys, the same hash values do not necessarily indicate the same key values. On the other hand, if two keys produce different hash values, those key values are always different.

In another embodiment of the inventive concept, the encryptions keys have limited scopes. In the embodiment described above, the scope of each key is equal to an LU. In other words, each LU is assigned one unique key. However, the inventive technique is not so limited and allows other types of key scopes.

In another alternative embodiment of the inventive concept, if the host 113 has access rights to a set of LUs, all those LUs may use the same key. On the other hand, another set of LUs, which are being used by the host 114 share another key, which is different from the first key. It should be noted that deletion of the key in the aforesaid alternative embodiment results not in deletion of data stored in just one LU, but it results in deletion of all data in the entire set of LU, which share the same key. Therefore, in this embodiment, the operating sequences described in FIG. 2 and FIG. 3 are initiated when sets of LUs are being deleted (FIG. 2) and when sets of LUs are being created (FIG. 3). As would be appreciated by one of ordinary skill in the art, the primary difference of the process flow of this embodiment is that the aforesaid processes handle multiple LUs instead of just one LU in the embodiment described hereinbefore.

In yet another alternative embodiment, any one LU is divided into several portions, e.g. several extents, with each portion utilizing a unique key. In such an embodiment, data stored in each portion of the LU may be deleted independently of the data stored within other portions of the same LU by deleting the key associated with the target portion. On the other hand, when an LU is expanded, the added storage area of a physical disk, if handled as one portion, may have its own unique key. Otherwise, the key assigned with the added portion must have the same value as one of the keys assigned to another portion of the same LU. As would be appreciated by ordinary skill in the art, any other data storage units, logical or otherwise, may be used instead of LUs.

The cryptographic method utilized by an embodiment of the inventive concept will now be described in detail. For the sake of simplicity, the key table 106 includes only one parameter of the applied encryption algorithm—the value of the encryption key stored in column 408. Therefore, in the embodiment of the invention described hereinbefore, the applied cryptographic method, such as encryption algorithm, the mode of operation, the initial vector and the length of the key are all fixed parameters. On the other hand, in an alternative embodiment, a variety of different cryptographic methods may be utilized to perform encryption of data stored in different LUs. In this embodiment, the table 106 or the column 408 thereof incorporates additional columns to accommodate various parameters and attributes of the cryptographic methods utilized. Such additional attributes may include, without limitation, the specification of the encryption algorithm, the mode of operation, the initial vector and the length of the encryption key.

Additionally, the cryptographic method used to generate the cipher text in column 508 may be specified using a column in the same or a different table, or using a predetermined storage location, a register or a variable. Also, in the embodiment described hereinabove, the encryption key and the decryption key are the same, as, for example, in AES or DES ciphers well known to person of ordinary skill in the art. However these keys may be different depending on the cryptographic algorithm utilized in the implementation of the inventive system. For example, the RSA algorithm, well known in the art, has an asymmetric encryption/decryption key structure.

The procedure for checking the overlap of the address ranges of different LUs or parts thereof will now be described. Specifically, at step 312, the crypto module 104 checks whether the address range associated with the cipher text string overlaps with the address range of the LU created at step 301. In an alternative embodiment of the invention, this checking, which is performed at step 312 of the process flow shown in FIG. 3 is skipped and the process proceeds to step 302. In such an embodiment, the address range information columns 409 and 507 do not have to be maintained, though the information in the column 407 is associated with the information in the columns 505 and 506 using an alternative means. If address range information is not maintained, the crypto module 104 may need to create more keys in order to proceed to step 313.

The procedure for deleting entries from cipher table will now be described. As stated above, deleting an encryption key has the same effect as securely deleting encrypted data. In an alternative embodiment of the invention, the data is deleted using other techniques such as overwriting the original data with random data multiple times. If the data is securely deleted, the address range for such deleted data in the cipher table 107 can be also deleted.

Also if an HDD is removed from the storage system, the address range on the HDD may be removed from the cipher table 107. In an embodiment of the invention, the controller 102 is capable of tracing HDDs using their unique identification numbers such as serial numbers and is capable of recognizing whether or not the HDD newly installed in the storage system has actually been previously installed, and the storage controller 102 does not discard the entry corresponding to the removed HDD from the cipher text table 107.

Figure 7:
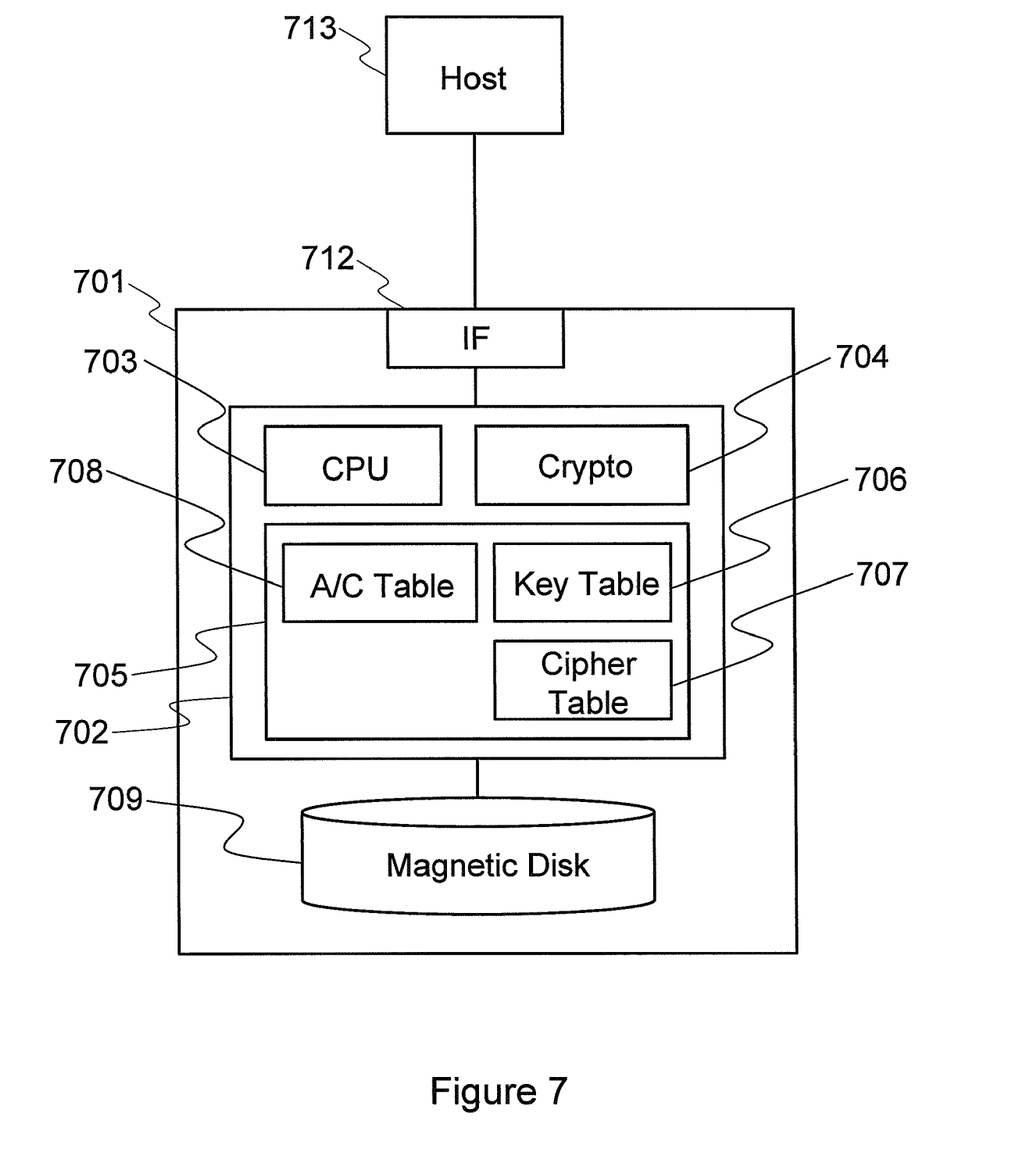
FIG. 7 illustrates an exemplary embodiment of the inventive technique implemented as an integral component of a hard disk drive or other suitable data storage unit.

It should be also noted that an embodiment of the inventive technique may also be implemented as an integral component of a hard disk drive or other suitable data storage unit, which would provide integral functionality for secure data disposal. Such an exemplary embodiment is illustrated in FIG. 7. The hard disk drive unit 701 shown in FIG. 7 is connected to a host 713 via an interface 712. The hard disk drive unit includes storage controller 702 incorporating CPU 703, cryptographic module 704, key table 706 and cipher table 707. The storage controller 702 further incorporates access control table 708, which defines access control permissions for the storage unit.

Magnetic disk 709 of the disk drive 701 may be divided into several partitions instead of LUs in the case of the storage system. Each partition may be assigned with unique key which is stored in the key table 706. When the partition is deleted, the assigned key is discarded after putting the cipher text and clear text in the cipher table 707.

Figure 9:
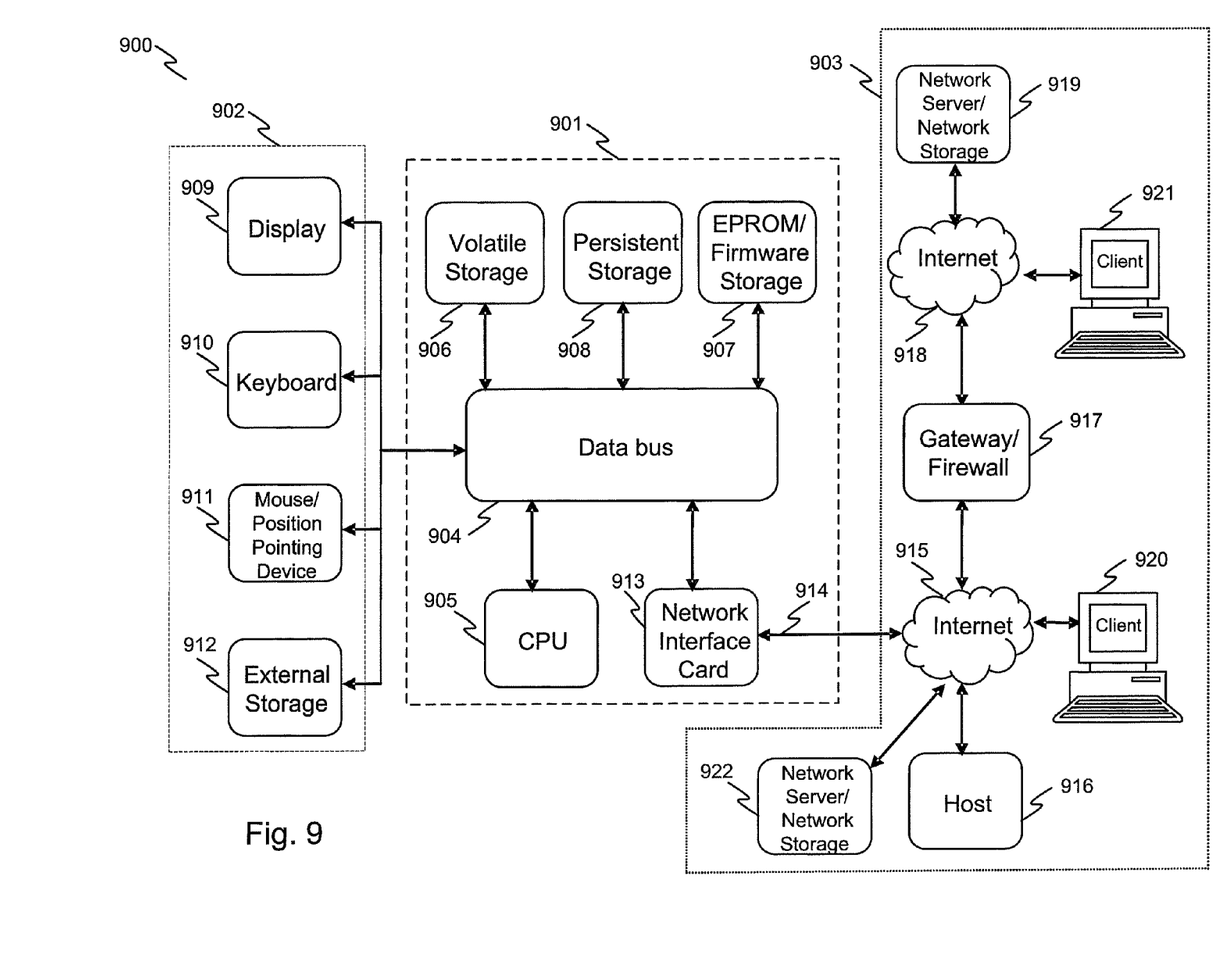
FIG. 9 illustrates an exemplary embodiment of a computer platform upon which the inventive system may be implemented.

FIG. 9 is a block diagram that illustrates an embodiment of a computer/server system 900 upon which an embodiment of the inventive methodology may be implemented. The system 900 includes a computer/server platform 901, peripheral devices 902 and network resources 903.

The computer platform 901 may include a data bus 904 or other communication mechanism for communicating information across and among various parts of the computer platform 901, and a processor 905 coupled with bus 901 for processing information and performing other computational and control tasks. Computer platform 901 also includes a volatile storage 906, such as a random access memory (RAM) or other dynamic storage device, coupled to bus 904 for storing various information as well as instructions to be executed by processor 905. The volatile storage 906 also may be used for storing temporary variables or other intermediate information during execution of instructions by processor 905. Computer platform 901 may further include a read only memory (ROM or EPROM) 907 or other static storage device coupled to bus 904 for storing static information and instructions for processor 905, such as basic input-output system (BIOS), as well as various system configuration parameters. A persistent storage device 909, such as a magnetic disk, optical disk, or solid-state flash memory device is provided and coupled to bus 901 for storing information and instructions.

Computer platform 901 may be coupled via bus 904 to a display 909, such as a cathode ray tube (CRT), plasma display, or a liquid crystal display (LCD), for displaying information to a system administrator or user of the computer platform 901. An input device 910, including alphanumeric and other keys, is coupled to bus 901 for communicating information and command selections to processor 905. Another type of user input device is cursor control device 911, such as a mouse, a trackball, or cursor direction keys for communicating direction information and command selections to processor 904 and for controlling cursor movement on display 909. This input device typically has two degrees of freedom in two axes, a first axis (e.g., x) and a second axis (e.g., y), that allows the device to specify positions in a plane.

An external storage device 912 may be connected to the computer platform 901 via bus 904 to provide an extra or removable storage capacity for the computer platform 901. In an embodiment of the computer system 900, the external removable storage device 912 may be used to facilitate exchange of data with other computer systems.

The invention is related to the use of computer system 900 for implementing the techniques described herein. In an embodiment, the inventive system may reside on a machine such as computer platform 901. According to one embodiment of the invention, the techniques described herein are performed by computer system 900 in response to processor 905 executing one or more sequences of one or more instructions contained in the volatile memory 906. Such instructions may be read into volatile memory 906 from another computer-readable medium, such as persistent storage device 908. Execution of the sequences of instructions contained in the volatile memory 906 causes processor 905 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 905 for execution. The computer-readable medium is just one example of a machine-readable medium, which may carry instructions for implementing any of the methods and/or techniques described herein. Such a medium may take many forms, including but not limited to, non-volatile media, volatile media, and transmission media. Non-volatile media includes, for example, optical or magnetic disks, such as storage device 908. Volatile media includes dynamic memory, such as volatile storage 906. Transmission media includes coaxial cables, copper wire and fiber optics, including the wires that comprise data bus 904. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, a carrier wave as described hereinafter, or any other medium from which a computer can read.

Various forms of computer readable media may be involved in carrying one or more sequences of one or more instructions to processor 905 for execution. For example, the instructions may initially be carried on a magnetic disk from a remote computer. Alternatively, a remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on the data bus 904. The bus 904 carries the data to the volatile storage 906, from which processor 905 retrieves and executes the instructions. The instructions received by the volatile memory 906 may optionally be stored on persistent storage device 908 either before or after execution by processor 905. The instructions may also be downloaded into the computer platform 901 via Internet using a variety of network data communication protocols well known in the art.

The computer platform 901 also includes a communication interface, such as network interface card 913 coupled to the data bus 904. Communication interface 913 provides a two-way data communication coupling to a network link 914 that is connected to a local network 915. For example, communication interface 913 may be an integrated services digital network (ISDN) card or a modem to provide a data communication connection to a corresponding type of telephone line.

As another example, communication interface 913 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 913 sends and receives electrical, electromagnetic or optical signals that carry digital data streams representing various types of information.

Network link 913 typically provides data communication through one or more networks to other network resources. For example, network link 914 may provide a connection through local network 915 to a host computer 916, or a network storage/server 917. Additionally or alternatively, the network link 913 may connect through gateway/firewall 917 to the wide-area or global network 918, such as an Internet. Thus, the computer platform 901 can access network resources located anywhere on the Internet 918, such as a remote network storage/server 919. On the other hand, the computer platform 901 may also be accessed by clients located anywhere on the local area network 915 and/or the Internet 918. The network clients 920 and 921 may themselves be implemented based on the computer platform similar to the platform 901.

Local network 915 and the Internet 918 both use electrical, electromagnetic or optical signals that carry digital data streams. The signals through the various networks and the signals on network link 914 and through communication interface 913, which carry the digital data to and from computer platform 901, are exemplary forms of carrier waves transporting the information.

Computer platform 901 can send messages and receive data, including program code, through the variety of network(s) including Internet 918 and LAN 915, network link 914 and communication interface 913. In the Internet example, when the system 901 acts as a network server, it might transmit a requested code or data for an application program running on client(s) 920 and/or 921 through Internet 918, gateway/firewall 917, local area network 915 and communication interface 913. Similarly, it may receive code from other network resources.

The received code may be executed by processor 905 as it is received, and/or stored in persistent or volatile storage devices 908 and 906, respectively, or other non-volatile storage for later execution. In this manner, computer system 901 may obtain application code in the form of a carrier wave.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with secure data deletion capabilities. It is intended that the specification and examples be considered as exemplary only, with a true scope and spirit of the invention being indicated by the following claims.

What is claimed is:

1. A computerized storage system comprising:
    a. A storage controller comprising a central processing unit (CPU) and a memory unit, wherein the storage controller is operable to:
        i. allocate a storage volume;
        ii. generate an encryption key for the allocated storage volume;
        iii. determine whether the encryption key is unique;
        iv. if the encryption key is not unique, generate a second encryption key for the allocated storage volume;
        v. store the generated encryption key or the second encryption key in the memory unit; and
    b. at least one storage device operatively coupled with the storage controller and operable to store data encrypted with the stored encryption key;
    wherein the memory unit is operable to store information relating to at least one old encryption key and the storage controller is operable to determine whether the generated encryption key is new using the stored information relating to at least one old encryption key, and,
    wherein the old encryption key is irrecoverable from the information relating to the old encryption key;
    wherein the information relating to the at the least one old encryption key comprises at least one clear text string encrypted using the at least one old encryption key and wherein the storage controller is operable to determine whether the generated encryption key is new by comparing the at least one clear text string encrypted using the at least one old encryption key with a clear text string encrypted using the generated key.

2. The computerized storage system of claim 1, wherein the memory unit is operable to store at least one existing encryption key and the storage controller is operable to determine whether the generated encryption key is unique by comparing the generated encryption key with the at least one existing encryption key.

3. The computerized storage system of claim 2, wherein the storage controller is operable to compare the generated encryption key with each of the at least one existing encryption key.

4. The computerized storage system of claim 1, wherein the storage controller is operable to determine whether the generated encryption key is unique by comparing the generated encryption key with the at least one existing encryption key and by comparing a storage address range of the allocated storage volume with a storage address range of a second storage volume corresponding to the at least one existing encryption key.

5. The computerized storage system of claim 1, wherein a third encryption key is generated if it has been determined that the generated encryption key is not new.

6. The computerized storage system of claim 5, wherein the information relating to the at the least one old encryption key comprises at least one hashed old encryption key and wherein the storage controller is operable to determine whether the generated encryption key is new by comparing the at least one hashed old encryption key with a hashed generated key.

7. The computerized storage system of claim 1, wherein the memory unit is operable to store cipher information for the allocated storage volume.

8. The computerized storage system of claim 1, wherein the storage controller is further operable to securely dispose of the data stored in the allocated storage volume by erasing the stored encryption key from the memory unit.

9. The computerized storage system of claim 1, wherein the storage controller is further operable to assigning a scope to the stored encryption key, the assigned scope being descriptive of storage area encrypted using the stored encryption key.

10. The computerized storage system of claim 1, wherein the storage controller is further operable to encrypt a clear text string with the stored encryption key and store the encrypted text string.

11. The computerized storage system of claim 1, wherein the memory unit is further operable to store a storage address range for the stored encryption key.

12. A computer-implemented method comprising:
  a. allocating a storage volume;
  b. generating an encryption key for the allocated storage volume;
  c. determining whether the encryption key is unique;
  d. if-the encryption key is not unique, generating a second encryption key for the allocated storage volume;
  e. storing the generated encryption key or the second encryption key;
  f. encrypting data associated with the allocated storage volume using the stored encryption key; and
  g. storing information relating to at least one old encryption key;
    wherein determining whether the generated encryption key is new comprises using the stored information relating to at least one old encryption key, and wherein the old encryption key is irrecoverable from the information relating to the old encryption key;
    wherein the information relating to the at the least one old encryption key comprises at least one clear text string encrypted using the at least one old encryption key and wherein the determining whether the generated encryption key is new comprises comparing the at least one clear text string encrypted using the at least one old encryption key with a clear text string encrypted using the generated key.

13. The computer-implemented method of claim 12, wherein determining whether the encryption key is unique comprises comparing the generated key with the at least one existing encryption key.

14. The computer-implemented method of claim 13, further comprising comparing the generated encryption key with each of the at least one existing encryption key.

15. The computer-implemented method of claim 12, wherein determining whether the encryption key is unique comprises comparing the generated encryption key with the at least one existing encryption key and by comparing a storage address range of the allocated storage volume with a storage address range of a second storage volume corresponding to the at least one existing encryption key.

16. The computer-implemented method of claim 12, further comprising generating a third encryption key if it has been determined that the generated encryption key is not new.

17. The computer-implemented method of claim 16, wherein the information relating to the at the least one old encryption key comprises at least one hashed old encryption key and wherein determining whether the generated encryption key is new comprises comparing the at least one hashed old encryption key with a hashed stored encryption key.

18. The computer-implemented method of claim 12, further comprising storing cipher information for the allocated storage volume.

19. The computer-implemented method of claim 12, further comprising securely disposing of the data stored in the allocated storage volume by erasing the stored encryption key.

20. The computer-implemented method of claim 12, further comprising assigning a scope to the stored encryption key, the assigned scope being descriptive of storage area encrypted using the stored encryption key.

21. The computer-implemented method of claim 12, further comprising encrypting a clear text string with the stored encryption key and storing the encrypted text string.

22. The computer-implemented method of claim 12, further comprising storing a storage address range for the stored encryption key.

23. A computer programming product embodied on a non-transitory computer readable medium, the computer programming product, when executed by one or more processors, causing the one or more processors to:
  a. allocate a storage volume;
  b. generate an encryption key for the allocated storage volume;
  c. determine whether the encryption key is unique;
  d. if the encryption key is not unique, generate a second encryption key for the allocated storage volume;
  e. store the generated encryption key or the second encryption key in a memory;
  f. encrypt data associated with the allocated storage volume using the stored encryption key; and
  g. store information relating to at least one old encryption key;
    wherein the determining whether the generated encryption key is unique comprises using the stored information relating to at least one old encryption key, and wherein the old encryption key is irrecoverable from the information relating to the old encryption key;
    wherein the information relating to the at the least one old encryption key comprises at least one clear text string encrypted using the at least one old encryption key and wherein the determining whether the generated encryption key is new comprises comparing the at least one clear text string encrypted using the at least one old encryption key with a clear text string encrypted using the generated key.

* * * * *